United States Patent
Lee

(10) Patent No.: US 7,406,000 B2
(45) Date of Patent: Jul. 29, 2008

(54) POSITIONING SYSTEM USING ULTRASONIC WAVES AND METHOD FOR OPERATING THE SAME

(75) Inventor: Dong Hwal Lee, Busan (KR)

(73) Assignee: KT Corporation (KR)

( * ) Notice: Subject to any disclaimer, the term of this patent is extended or adjusted under 35 U.S.C. 154(b) by 0 days.

(21) Appl. No.: 11/517,691

(22) Filed: Sep. 8, 2006

(65) Prior Publication Data

US 2007/0070812 A1    Mar. 29, 2007

Related U.S. Application Data

(63) Continuation of application No. PCT/KR2005/000636, filed on Mar. 7, 2005.

(30) Foreign Application Priority Data

Mar. 8, 2004    (KR) ............... 10-2004-0015377

(51) Int. Cl.
G01S 3/80    (2006.01)
G01S 11/14    (2006.01)

(52) U.S. Cl. ............................... 367/127; 367/128

(58) Field of Classification Search ............... 367/127
See application file for complete search history.

(56) References Cited

U.S. PATENT DOCUMENTS

| | | |
|---|---|---|
| 4,980,871 A | 12/1990 | Sieber et al. |
| 5,150,310 A | 9/1992 | Greenspun et al. |
| 5,793,704 A | 8/1998 | Freger |
| 5,810,105 A | 9/1998 | Trainer |
| 5,831,937 A | 11/1998 | Weir et al. |
| 6,731,198 B1 | 5/2004 | Stobbe et al. |
| 2005/0219950 A1* | 10/2005 | Rowe ..................... 367/118 |
| 2007/0070812 A1* | 3/2007 | Lee ........................ 367/128 |

FOREIGN PATENT DOCUMENTS

| | | |
|---|---|---|
| EP | 1018692 A2 | 11/1999 |
| JP | 55-59354 | 5/1980 |
| JP | 56-18717 | 2/1981 |

(Continued)

OTHER PUBLICATIONS

Jong C. Park et al., "A Study on Performance Improvement of Ultrasonic Ranging System" 1991, pp. 1209-1213.

*Primary Examiner*—Dan Pihulic
(74) *Attorney, Agent, or Firm*—Knobbe Martens Olson & Bear LLP

(57) ABSTRACT

Provided is a method for controlling a positioning system using ultrasonic waves. The method installs a plurality of ultrasonic satellites generating ultrasonic signals to position a mobile. The method sequentially gives satellite identification numbers to the plurality of ultrasonic satellites, generates a synchronization signal and providing it to the plurality of ultrasonic satellites, and allows the mobile to receive ultrasonic signals, which are generated by the plurality of ultrasonic satellites in the order of the satellite identification numbers when the ultrasonic satellites receive the synchronization signal, to measure distances between the mobile and the ultrasonic satellites. The positioning system includes ultrasonic satellites, a mobile that receives ultrasonic signals from the ultrasonic satellites to recognize its current position, a reference time broadcaster for providing a synchronization signal to ultrasonic satellites and the mobile, and a server for providing the coordinates of the ultrasonic satellites to the mobile.

25 Claims, 9 Drawing Sheets

FOREIGN PATENT DOCUMENTS

| | | |
|---|---|---|
| JP | 2001-337157 | 12/2001 |
| KR | 10-2001-0097597 A | 11/2001 |
| KR | 10-2003-0093387 A | 12/2003 |
| KR | 10-2004-0052610 A | 6/2004 |
| KR | 10-2004-0101494 A | 12/2004 |
| KR | 10-2005-0014051 A | 2/2005 |
| WO | WO 95/14241 | 5/1995 |
| WO | WO 99/28762 | 6/1999 |
| WO | WO 99/28763 | 6/1999 |
| WO | 03/088136 A2 | 10/2003 |
| WO | WO 2004029649 A1 * | 4/2004 |
| WO | WO 2005085897 A1 * | 9/2005 |

* cited by examiner

POSITIONING SYSTEM USING ULTRASONIC WAVES AND METHOD FOR OPERATING THE SAME

CROSS-REFERENCE TO RELATED APPLICATION

This application is a continuation application under 35 U.S.C. § 365(c) of International Application No. PCT/KR2005/000636, filed Mar. 7, 2005 designating the United States. International Application No. PCT/KR2005/000636 was published in English as WO2005/085897 A1 on Sep. 15, 2005. This application further claims the benefit of the earlier filing dates under 35 U.S.C. § 365(b) of Korean Patent Application No. 10-2004-0015377 filed Mar. 8, 2004. This application incorporates herein by reference the International Application No. PCT/KR2005/000636 including the International Publication No. WO2005/085897 A1 and the Korean Patent Application No. 10-2004-0015377 in their entirety.

BACKGROUND

1. Field of the Invention

The present invention relates to a system of determining a position of a mobile device, and more particularly, to determining a position by using ultrasonic waves.

2. Related Art

Currently widely used positioning systems include a GPS (Global Positioning System) that covers a wide area using an artificial satellite. However, the GPS cannot be used indoors and it may not be operated in an area where buildings stand close together. Furthermore, although the GPS has good relative accuracy for a wide area, it has repetitive accuracy as low as several meters for a narrow area.

Korean Patent. No. 0351962, entitled 'Navigation System using Pseudo-Satellite', proposes a method of using the conventional positioning system indoors. However, this method is difficult to practically use because there is a large variation in signal intensity in a close range. Accordingly, a variety of techniques of using ultrasonic waves for positioning systems have been proposed.

FIG. 1 shows the Bat ultrasonic location system proposed as an active Bat system by AT&T Laboratories Cambridge. In this system, a mobile generates ultrasonic waves. The positioning method using ultrasonic waves is difficult to simultaneously transmit ultrasonic waves due to interference of ultrasonic waves, different from the method of using electric waves. Thus, the mobile generates an ultrasonic signal and a plurality of receivers measure arrival time of the ultrasonic signal.

Moreover, Korean Patent Publication No. 2003-009387, entitled 'Ultrasonic sensor system for positioning mobiles' proposes a method by which mobiles receive ultrasonic waves. According to this method, however, multiple mobiles cannot be independently operated because the mobiles transmit synchronization signals. Particularly, this method requires an additional rule because there is interference among the multiple mobiles.

Furthermore, U.S. Pat. No. 5,793,704, entitled 'Method and Device for Ultrasonic Ranging' discloses a ranging method using ultrasonic waves and maximum amplitude. However, this method is considerably complicated and performance-restrictive.

SUMMARY OF CERTAIN INVENTIVE ASPECTS

An aspect of the invention provides a method of determining a position of a mobile device, which may comprise: receiving, by a mobile device, a synchronization signal; synchronizing the mobile device using the synchronization signal; receiving, by the mobile device at a receipt time, an ultrasonic signal transmitted from a source located at a source location at a transmission time; and determining the mobile device's position using information of the source location and a time difference between the receipt time and the transmission time of the ultrasonic signal.

In the foregoing method, the method may further comprise receiving information indicative of the transmission time. The information may comprise a time difference between transmission of the synchronization signal and the transmission time of the ultrasonic signal. The method may further comprise receiving, by the mobile device, the information of the source location. The information of the source location may be pre-stored in the mobile device.

Still in the foregoing method, the method may further comprise receiving, by the mobile device at an additional receipt time, an additional ultrasonic signal transmitted from an additional source located at an additional source location at an additional transmission time, and wherein determining the mobile device's position may further use information of the additional source location and a time difference between the additional receipt time and the additional transmission time. Determining may comprise computing a distance between the additional source location and the mobile device. The method may repeat the act of receiving a further additional ultrasonic signal, and wherein determining may further use information relating to the further additional ultrasonic signal. Each of the transmission time and the additional transmission time may have a predetermined time interval from transmission of the synchronization signal from a source thereof. Determining may further use information of each predetermined time interval. Determining may comprise computing a distance between the source location and the mobile device. The method may further comprise receiving, by the mobile device, a transmission speed of the ultrasonic signal. Determining may further use the transmission speed of the ultrasonic signal.

Another aspect of the invention provides a system of determining a position of a mobile device, which may comprise: a synchronizer configured to transmit a synchronization signal; a plurality of ultrasonic signal transmitters, each of which is configured to transmit an ultrasonic signal at a predetermined time; and a mobile device configured to receive the synchronization signal and ultrasonic signals from at least part of the plurality of ultrasonic signal transmitters, wherein the mobile device is configured to determine the mobile device's position using information available thereto.

In the foregoing system, the information may comprise location information of the at least part of the plurality of ultrasonic signal transmitters and information of a period during which the ultrasonic signal travels from each of the at least part of the plurality of ultrasonic signal transmitters to the mobile device. The mobile device may be configured to receive information indicative of the predetermined time for each of the at least part of the plurality of ultrasonic signal transmitters to the mobile device. The information indicative of the predetermined time may comprise a time difference between transmission of the synchronization signal and the predetermined time for each of the at least part of the plurality of ultrasonic signal transmitters to the mobile device. The mobile device may be configured to receive location information of the at least part of the plurality of ultrasonic signal transmitters. Location information of the at least part of the plurality of ultrasonic signal transmitters may be pre-stored in the mobile device. The predetermined time of each ultrasonic signal transmitter may have a time interval from transmission of the synchronization signal from a source thereof. The predetermined time of each ultrasonic signal transmitter may be different from that of another.

Still another aspect of the invention provides a method of operating the foregoing system, which may comprise, transmitting a synchronization signal from the synchronizer; synchronizing at least part of the plurality of ultrasonic signal transmitters and the mobile device using the synchronization signal; transmitting an ultrasonic signal from each of the at least part of the plurality of ultrasonic signal transmitters at a predetermined time thereof; and determining the mobile device's position using location information of the at least part of the plurality of ultrasonic signal transmitters and information of a period during which the ultrasonic signal travels from each of the at least part of the plurality of ultrasonic signal transmitters to the mobile device.

The inventor proposed a new ranging method using ultrasonic waves in order to solve the problems of conventional ranging methods. The ranging method and apparatus proposed by the inventor extends a measurement range and improves measurement accuracy compared to the conventional methods.

Accordingly, an aspect of the present invention provides a new positioning system using ultrasonic waves, which can control mobiles more effectively by using the proposed ranging method, and a method for controlling the positioning system.

As described above, the positioning system using ultrasonic waves and the method of controlling the same according to an aspect of the present invention can realize accurate small-scale GPS. A cleaning robot currently widely used is expensive because it uses a gyro, an acceleration sensor, a camera and so on for positioning. However, the positioning system of an aspect of the present invention can perform positioning at a very low cost.

In the meantime, location-based services may require recognition of current positions. In this case, an aspect of the present invention can provide positioning cheaply and accurately. For example, users can find a small entrance in a complicated market place or a specific store in an area where similar businesses are crowded.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

DESCRIPTION OF THE DRAWINGS

Further aspects and advantages of the invention can be more fully understood from the following detailed description taken in conjunction with the accompanying drawings, in which.

DETAILED DESCRIPTION OF EMBODIMENTS

Embodiments of the present invention will now be described in detail with reference to the accompanying drawings.

Figure 2:
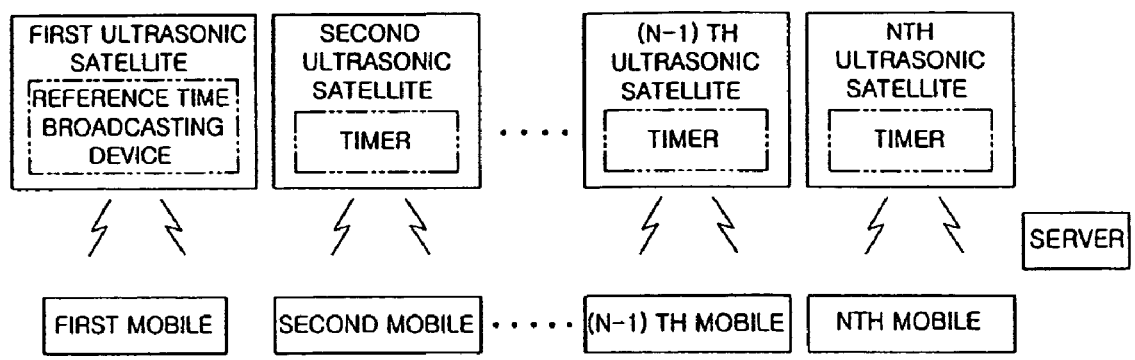
FIG. 2 is a block diagram of a positioning system using ultrasonic waves according to an embodiment of the present invention.

FIG. 2 is a block diagram of a positioning system using ultrasonic waves according to an embodiment of the present invention. Referring to FIG. 2, the positioning system using ultrasonic waves includes a reference time broadcasting device, a plurality of ultrasonic satellites generating ultrasonic signals, mobiles that receive the ultrasonic signals to recognize their current positions, a server for providing coordinates of the ultrasonic satellites, and a wired/wireless network for connecting the server, the mobiles and the ultrasonic satellites. In the positioning system using ultrasonic waves according to an embodiment of the present invention, the reference time broadcasting device can be separately constructed. Otherwise, one of the plurality of ultrasonic satellites can serve as the reference broadcasting device. Furthermore, the ultrasonic satellites can respectively include timers such that the ultrasonic satellites can generate ultrasonic waves independently using only the initial synchronization signal.

The positioning system using ultrasonic waves according to an embodiment of the present invention can realize an accurate small-scale positioning system.

Furthermore, an embodiment of the present invention provides a method for controlling the positioning system using ultrasonic waves, which controls the position of a mobile using a plurality of ultrasonic satellites generating ultrasonic waves. The method for controlling the positioning system using ultrasonic waves sequentially gives identification numbers to the plurality of ultrasonic satellites, generates a synchronization signal and provides it to the ultrasonic satellites, and allows the mobile to receive ultrasonic waves, transmitted from the plurality of ultrasonic satellites in the order of the identification numbers when the ultrasonic satellites receive the synchronization signal, to thereby measure distances between the mobile and the ultrasonic satellites.

The method for controlling the positioning system using ultrasonic waves can save radio resources and achieve effective positioning compared to the conventional positioning systems.

Embodiments of the present invention will now be explained in detail with reference to FIGS. 2 through 10. Like reference characters designate corresponding parts throughout FIGS. 2 to 10. FIGS. 2 to 10 simplify or omit illustration and explanation about the positioning system using ultrasonic satellites and mobiles and the positioning method previously proposed by the inventor because they can be easily understood by those skill in the art but illustrate parts related to an embodiment of the present invention.

Referring to FIG. 2, when a plurality of ultrasonic signals are simultaneously transmitted and received, interference occurs among the ultrasonic signals. Accordingly, the positioning system using ultrasonic waves according to an embodiment of the present invention transmits a single ultrasonic signal at a specific moment of time. For this, the positioning system divides a time period and sequentially transmits the ultrasonic signals. The reference time broadcasting device provides the synchronization signal to the ultrasonic satellites currently operating and mobiles.

An embodiment of the present invention measures distances between a mobile and a plurality of ultrasonic satellites and calculates distances between the mobile and at least four ultrasonic satellites to obtain three-dimensional coordinates of the mobile. For this, the positioning system using ultrasonic waves according to an embodiment of the present invention can be used not only in an indoor area but also in an outdoor area of a range of tens meter and has high resolution of lower than several millimeter by using the new ranging method (disclosed in Korean Patent Application No. 10-2003-0052239) previously proposed by the inventor. In the positioning system using ultrasonic waves, the ultrasonic satellites sequentially generate ultrasonic signals such that the positioning system can be applied to multiple mobiles in the same manner. The mobiles receive the ultrasonic signals and reference time is separately broadcasted for synchronization. That is, the positioning system according to an embodiment of the present invention has the reference time broadcasting device for providing the synchronization signal. A mobile receives the synchronization signal from the reference time broadcasting device as the ultrasonic satellites do and calculates the distances between the mobile and the ultrasonic satellites. This method is applied to multiple mobiles in the same manner.

Figure 3:
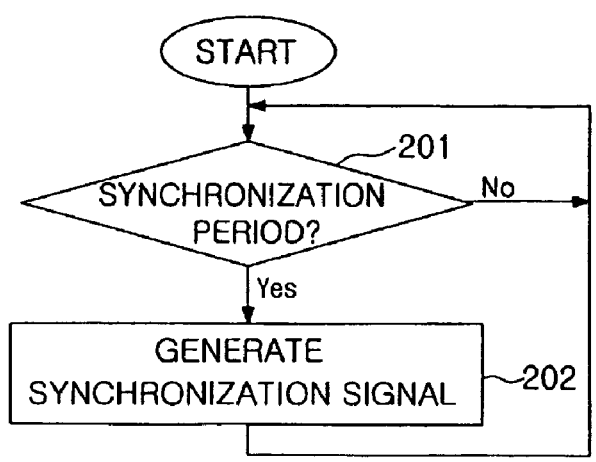
FIG. 3 is a flow chart showing the operation of a reference time broadcasting device in a method of controlling the positioning system using ultrasonic waves according to an embodiment of the present invention.
Figure 4:
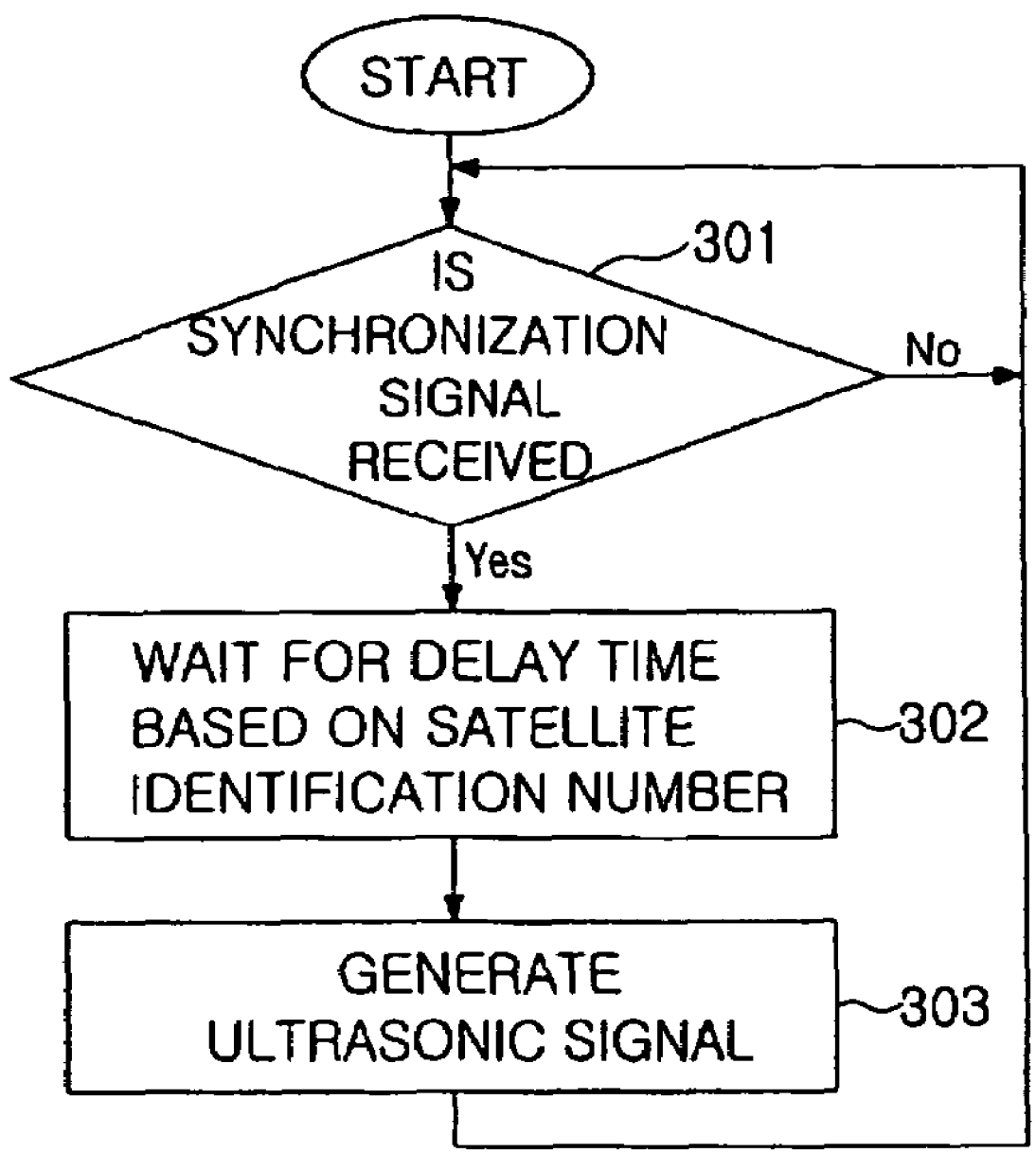
FIG. 4 is a flow chart showing the operation of an ultrasonic satellite in the method of controlling the positioning system using ultrasonic waves according to an embodiment of the present invention.
Figure 5:
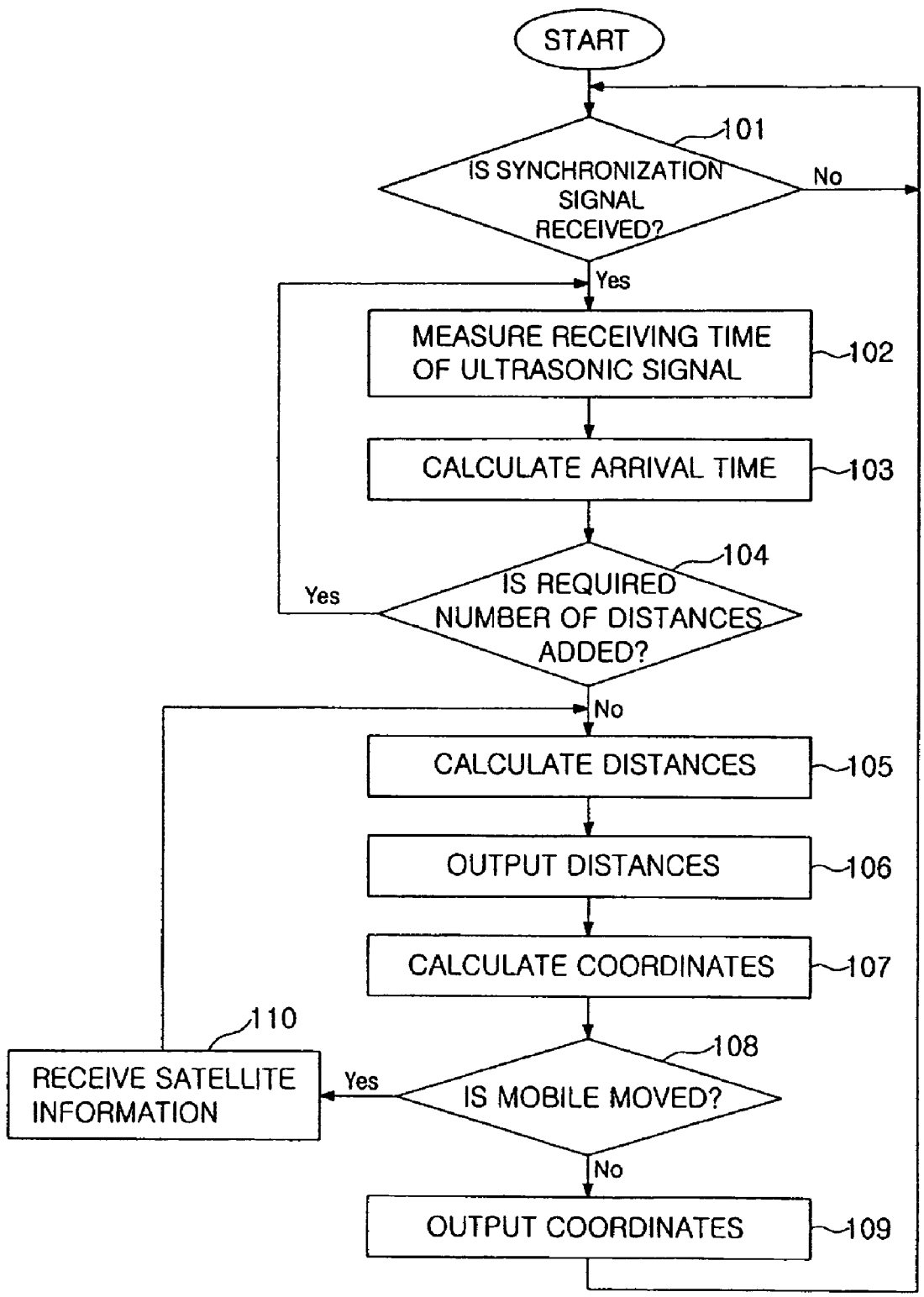
FIG. 5 is a flow chart showing the operation of a mobile in the method of controlling the positioning system using ultrasonic waves according to an embodiment of the present invention.

FIG. 3 is a flow chart showing the operation of the reference time broadcasting device in the method of controlling the positioning system using ultrasonic waves according to an embodiment of the present invention, and FIG. 4 is a flow chart showing the operation of an ultrasonic satellite in the method of controlling the positioning system using ultrasonic waves according to an embodiment of the present invention. FIG. 5 is a flow chart showing the operation of a mobile in the method of controlling the positioning system using ultrasonic waves according to an embodiment of the present invention.

Referring to FIGS. 2 and 3, the period of time for which a plurality of ultrasonic satellites sequentially generate ultrasonic signals is set as a synchronization period, and the reference time broadcasting device waits for the period of time corresponding to the synchronization period in the step 201. Then, the reference time broadcasting device generates the synchronization signal in the step 202. The reference time broadcasting device repeats the aforementioned operation. Here, one of the currently operated ultrasonic satellites can replace the reference time broadcasting device.

Otherwise, commercial broadcast including visual information, a GPS satellite, a wireless LAN or a cellular phone can be used as the reference time broadcasting device.

The operation of the ultrasonic satellites will now be explained. A mobile receives the coordinates of the multiple ultrasonic satellites. The ultrasonic satellite including the reference time broadcasting device (the first ultrasonic satellite in FIG. 2) generates a synchronization signal using electric waves and transmits an ultrasonic signal. The remaining ultrasonic satellites and the mobile receive the synchronization signal using electric waves. The second ultrasonic satellite transmits an ultrasonic signal after the lapse of $1/10$ seconds after it receives the synchronization signal. The third ultrasonic satellite (the (n−1)-th ultrasonic satellite in FIG. 2) transmits an ultrasonic signal after the lapse of $2/10$ seconds after it receives the synchronization signal. The fourth ultrasonic satellite (the n-th ultrasonic satellite in FIG. 2) transmits an ultrasonic signal after the lapse of $3/10$ seconds after it receives the synchronization signal. The ultrasonic satellite including the reference time broadcasting device (the first ultrasonic satellite in FIG. 2) generates a synchronization signal using electric waves and transmits an ultrasonic signal again after the lapse of $4/10$ seconds. The above-described process is repeated.

Referring to FIG. 4, each ultrasonic satellite waits for the synchronization signal of the reference time broadcasting device in the step 301. When the ultrasonic satellite receives the synchronization signal, it waits for a delay time in response to its order in the step 302, and then transmits an ultrasonic signal in the step 303. This basic operation of the ultrasonic satellite is repeated.

The distance between ultrasonic satellites is measured to provide reference information about the velocity of sound of the current medium. Here, time is measured and the distance is calculated in proportion to the velocity of sound. The velocity of sound depends on the state of medium. An embodiment of the present invention finds out the velocity of sound without measuring the state of medium by measuring ultrasonic propagation time for a fixed distance between previously installed satellites. Study results about this technique are described in collection of learned papers of Korean automation and control conference, 22-23, p. 1209, issued on October, 1991.

The mobile measures the coordinates of the plurality of ultrasonic satellites and distances between the mobile and the ultrasonic satellites to calculate the current position and posture thereof. The coordinates of the ultrasonic satellites are previously input to the mobile when the ultrasonic satellites are fixed. When the ultrasonic satellites are moved from other places, a server connected to a network provides the coordinates of the ultrasonic satellites to the mobile. The distances between the mobile and the ultrasonic satellites are calculated by measuring arrival time of the ultrasonic signals transmitted from the ultrasonic satellites with the ultrasonic satellites have an equal ultrasonic propagation delay time in synchronization with the synchronization signal provided by the reference time broadcasting device. That is, the ultrasonic propagation time of the ultrasonic satellite including the reference time broadcasting device is measured from the moment when the ultrasonic satellite receives the synchronization signal, and the ultrasonic propagation time of the second ultrasonic satellite is measured after the lapse of $1/10$ seconds. Furthermore, the ultrasonic propagation time of the third ultrasonic satellite is measured with the lapse of $2/10$ seconds and the ultrasonic propagation time of the third ultrasonic satellite is measured after lapse of $3/10$ seconds. The ultrasonic propagation time is converted into a distance. The distance is obtained from the relationship, distance=velocity of sound×propagation time.

For the measurement of posture, the mobile receives the ultrasonic signals at two points thereof in the case of two dimension and at least three points thereof in the case of three dimension. A plurality of mobiles independently receive the ultrasonic signals of the ultrasonic satellites and use the signals for recognizing their positions. The mobile receives the synchronization signal using electric waves, measures the arrival time of the firstly arrived ultrasonic signal and converts the arrival time into the distance between the mobile and the first satellite. Then, the mobile measures the arrival time of the ultrasonic signal, which is arrived after the lapse of $1/10$ seconds, and converts it into the distance between the mobile and the second satellite. In addition, the mobile measures the arrival time of the ultrasonic signal arrived after the lapse of $2/10$ seconds, and converts it into the distance between the mobile and the third satellite. Furthermore, the mobile measures the arrival time of the ultrasonic signal arrived after the lapse of $3/10$ seconds, and converts it into the distance between the mobile and the fourth satellite.

Referring to FIG. 5, the mobile waits for the synchronization signal as the ultrasonic satellites do in the step 101. When the mobile receives the synchronization signal, the mobile waits for ultrasonic signals and, when it receives the ultrasonic signals, measures the receiving time of the ultrasonic signals in the step 102. The mobile calculates the arrival time in the order of the ultrasonic satellites. Here, the arrival time is obtained from the relationship, arrival time=measured time-delay time based on the order of corresponding ultrasonic satellite.

Measurement of distances required for calculating the coordinates of the mobile is repeated in the step 104. Then, the distances are calculated from the arrival time using the velocity of sound in the step 105. Then, distance information is output through an output device in the step 106. The output device displays the distance information in figures using liquid crystal or transmits the distance information to another device through communication. The coordinates of the mobile is calculated using the distance information and possessed satellites coordinate information in the step 107. When the calculated coordinates are considerably different from the previous coordinates, it is judged that the current position of the mobile is located in the coverage area of an ultrasonic satellite different from the ultrasonic satellite corresponding to the possessed satellite coordinate information in the step 108. In this case, satellite information is received in the step 110, and then the routines from the step 105 are repeated. When the current position of the mobile is identical to the previous position in the step 108, the coordinate information is output through the output device in the step 109.

Figure 1:
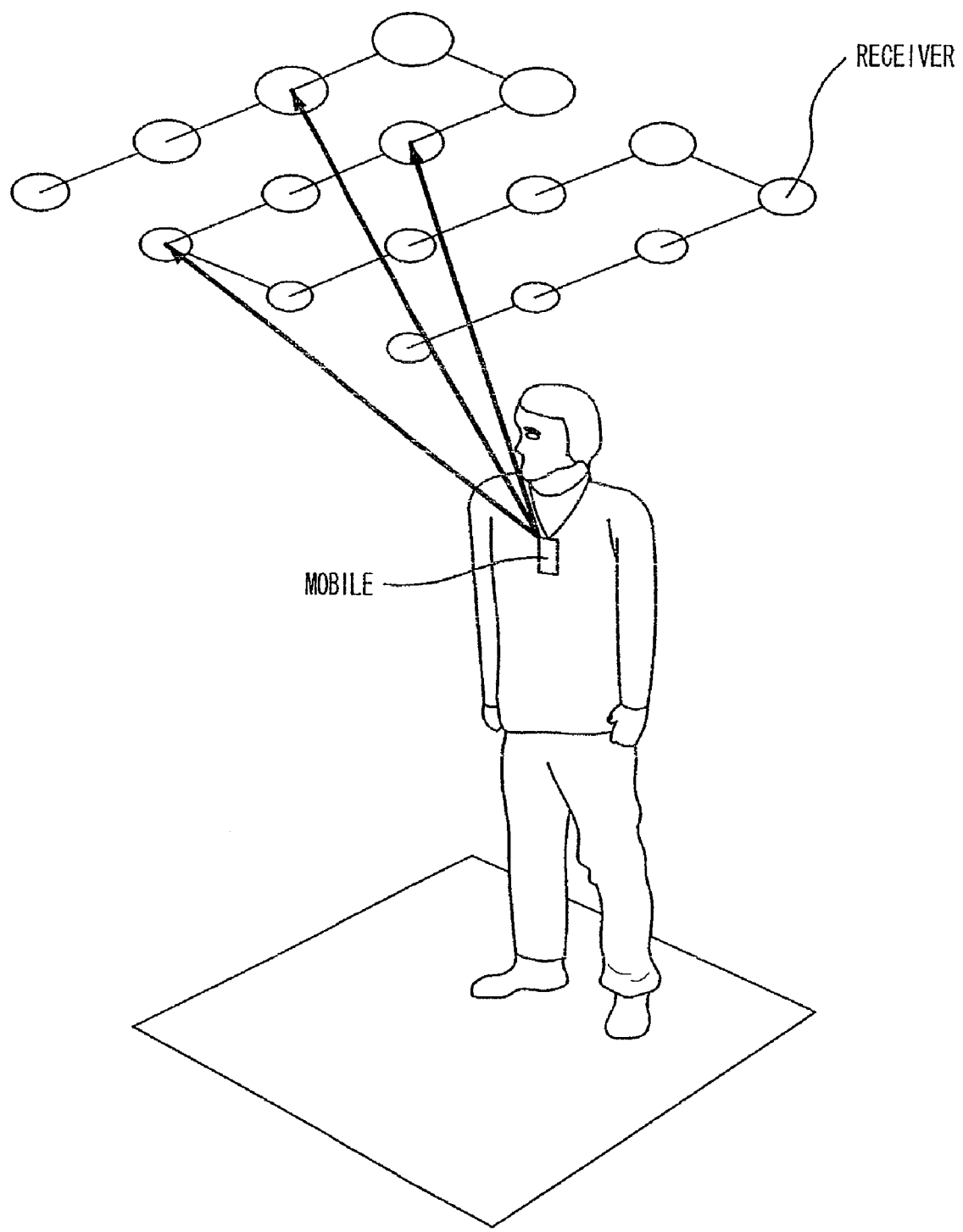
FIG. 1 is a photograph for explaining an exemplary positioning system using ultrasonic waves.
Figure 6:
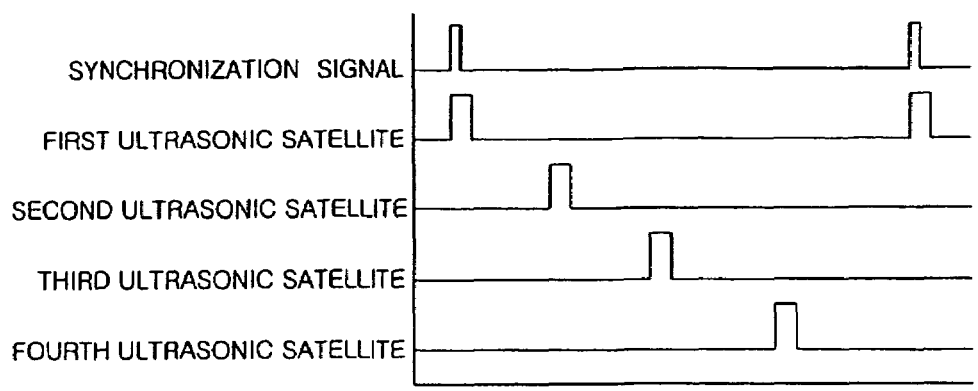
FIG. 6 shows the operations of a synchronization signal and ultrasonic satellites according to the positioning system using ultrasonic waves and the method of controlling the same according to an embodiment of the present invention.

FIG. 6 shows the operations of the synchronization signal and ultrasonic satellites according to the positioning system using ultrasonic waves and the method of controlling the same according to an embodiment of the present invention. Referring to FIGS. 1 and 6, the positioning system using ultrasonic waves and the method for controlling the same according to the above embodiments and other embodiments of the present invention respectively install timers in the ultrasonic satellites such that the ultrasonic satellites can use a virtual synchronization signal according to the timers. Accordingly, embodiments of the present invention enables effective mobile positioning while saving radio resources. That is, the positioning system using ultrasonic waves according to the embodiments of the present invention respectively installs the timers in the plurality of ultrasonic satellites such that the ultrasonic satellites generate ultrasonic signals at the time set by the respective timers when the ultrasonic satellites receive the synchronization signal, as shown in FIG. 6. After each ultrasonic satellite receives the initial synchronization signal, it periodically generates an ultrasonic signal at the time set by the timer. Accordingly, the number of times of generating the synchronization signal is decreased more effectively and thus radio resources can be saved.

According to embodiments of the present invention, the period of controlling the generation of ultrasonic signal of each ultrasonic satellite is not limited, distinguished from the method of generating the ultrasonic signal whenever the ultrasonic satellite receives the synchronization signal. Thus, a plurality of mobiles can be effectively controlled.

Figure 7:
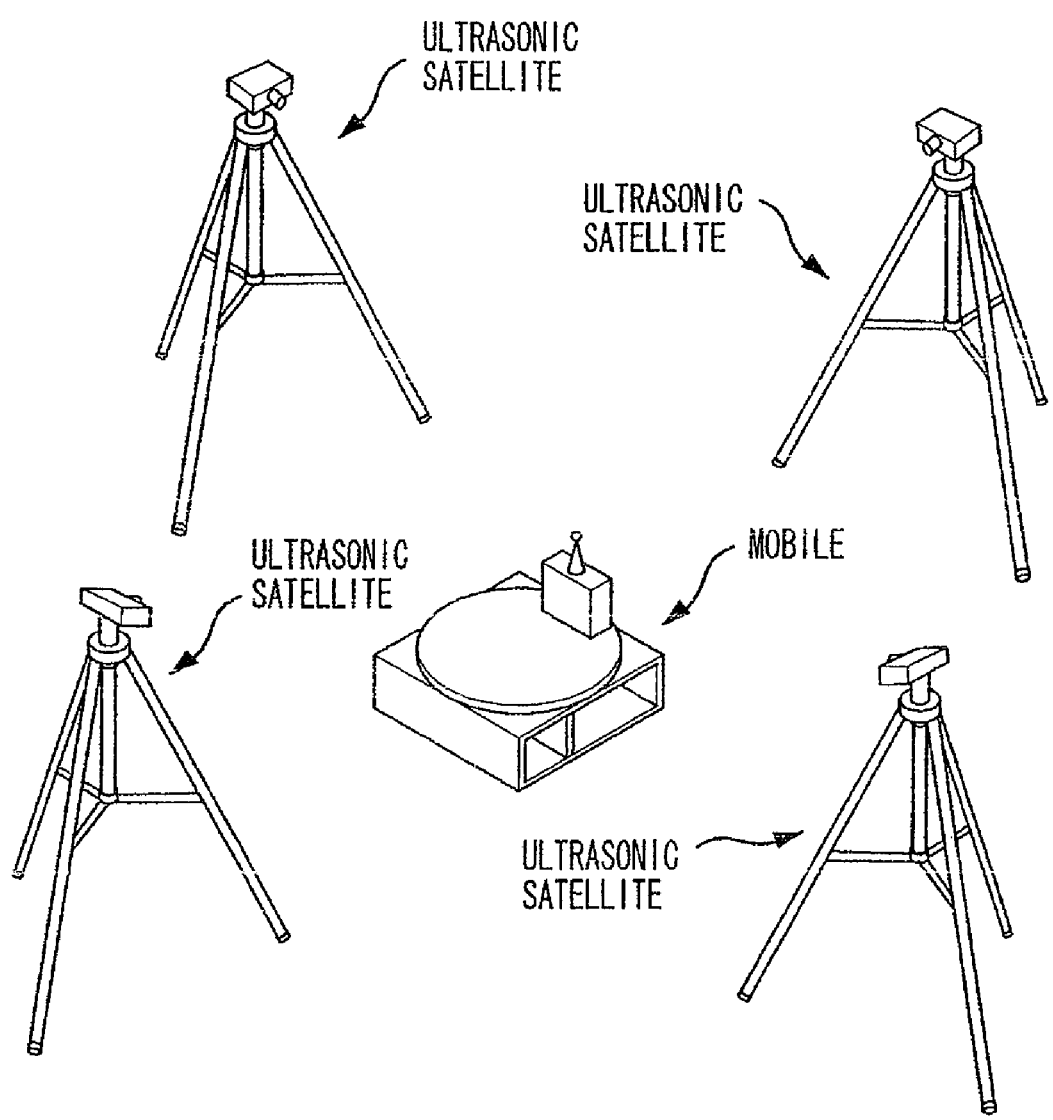
FIG. 7 is a photograph showing an arrangement for experiment on the positioning system using ultrasonic waves according to an embodiment of the present invention.
Figure 8:
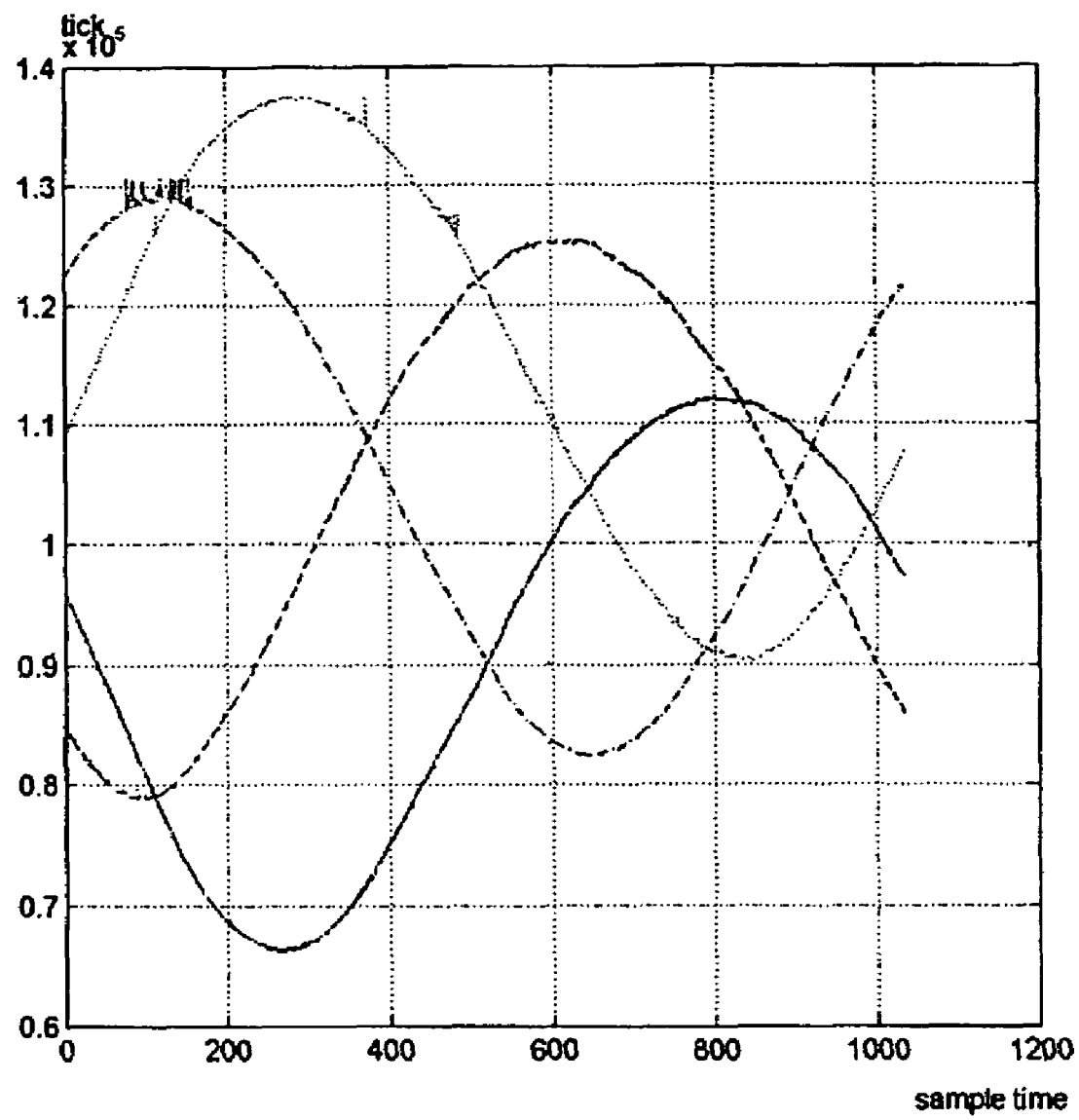
FIG. 8 is a graph showing an example of distance data between a mobile and ultrasonic satellites, which is obtained through the experiment of FIG. 7.

FIG. 7 is a photograph showing an arrangement for experiment on the positioning system using ultrasonic waves according to an embodiment of the present invention, and FIG. 8 is a graph showing an example of distance data between a mobile and ultrasonic satellites, which is obtained through the experiment of FIG. 7.

Figure 9:
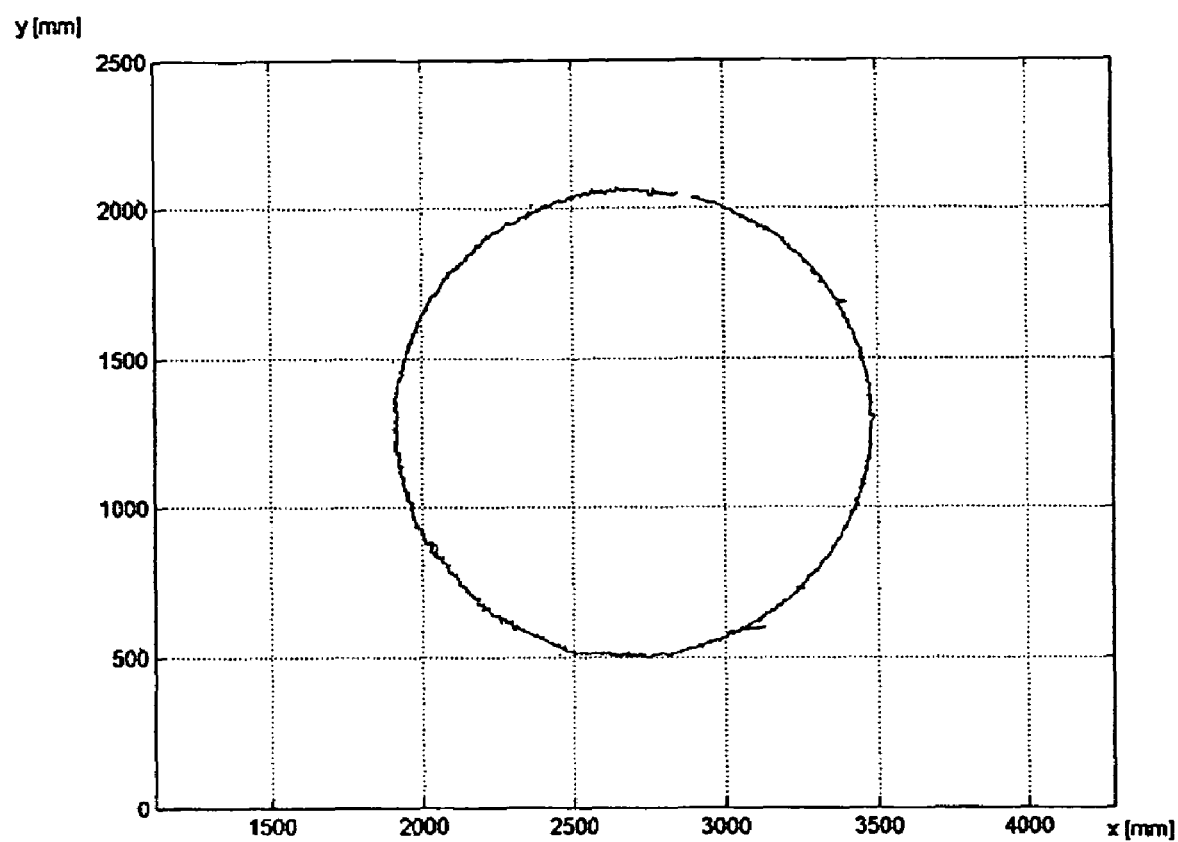
FIG. 9 is a graph showing an example of two-dimensional coordinate data of the mobile, which is obtained through the experiment of FIG. 7.

FIG. 9 is a graph showing an example of two-dimensional coordinate data of a mobile, which is obtained through the experiment of FIG. 7.

The experimental arrangement shown in FIG. 7 is used for verifying the positioning system using ultrasonic waves and the method for controlling the same according to embodiments of the present invention. In this arrangement, one of a plurality of ultrasonic satellites also serves as the reference time broadcasting device. The ultrasonic satellites generate ultrasonic signals in response to the synchronization signal and in the order of their identification numbers such that the mobile can measure distances between the mobile and the ultrasonic satellites.

FIGS. 8 and 9 show distances between the mobile and four ultrasonic satellites and the coordinate data of the mobile, obtained from the experiment using the arrangement of FIG. 7 in which the mobile is moved on a circular track. In the actual experiment, time is measured at the period of 11.0592 MHz, and the periods of time required for the ultrasonic signals generated by the ultrasonic satellites to be arrived at the mobile is shown in FIG. 8. To calculate three-dimensional coordinates of the mobile, four ultrasonic satellites whose minimum coordinates are known and distances between the mobile and the four ultrasonic satellites are required. A sphere having the coordinates of each ultrasonic satellite as the origin can be defined. Two spheres according to two ultrasonic satellites generate a single cross circle. Two points of intersection of a sphere according to another ultrasonic satellite and the cross circle can be obtained. One of the two points is decided according to the remaining ultrasonic satellite. This principle may be applied to GPS using an artificial satellite, which is well known in the art.

The distances are measured using ultrasonic waves according to frequencies. Signal processing according to frequencies is disclosed in Korean Patent Application No. 10-2003-0052239, applied by the inventor. A wired/wireless network is constructed of a plurality of ultrasonic satellites, a plurality of mobiles, and a plurality of servers. The servers provide the coordinates of the ultrasonic satellites to the mobiles. The coordinates of the ultrasonic satellites are measured when the ultrasonic satellites are installed and registered in the servers connected to the network. The mobiles are connected to the servers through the network and obtain the coordinates of the ultrasonic satellites that they want to refer to using the identification numbers of the satellites from the servers. To calculate the current three-dimensional position of a mobile, at least four ultrasonic satellites are used and, if required, a plurality of ultrasonic satellites are additionally used. Accordingly, the mobile is provided with information of available ultrasonic satellites for the current position thereof according to the network.

Figure 10:
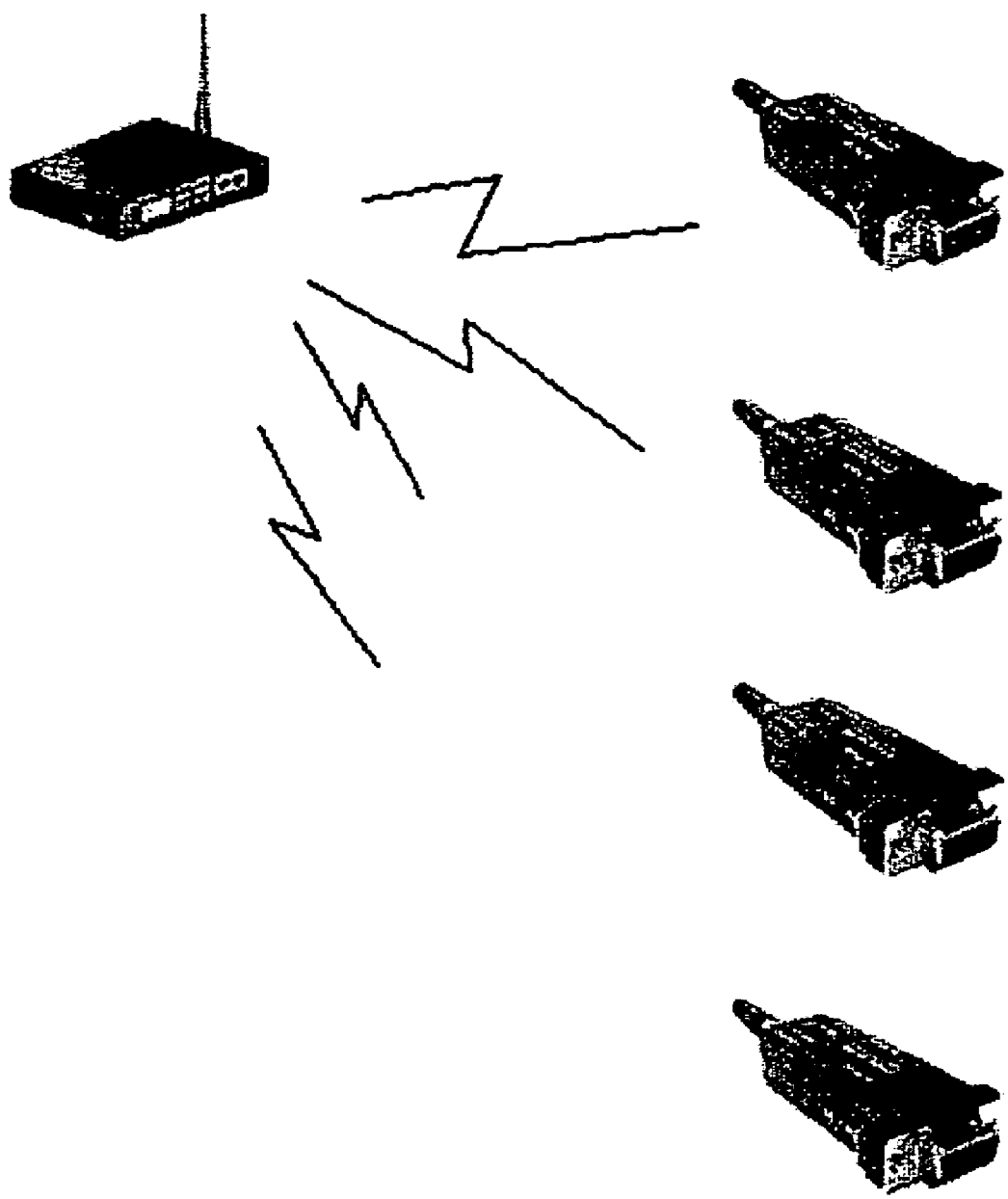
FIG. 10 is a photograph showing an example of arrangement of a wireless network using Bluetooth in the positioning system using ultrasonic waves according to an embodiment of the present invention.

FIG. 10 is a photograph showing an example of arrangement of a wireless network using Bluetooth in the positioning system using ultrasonic waves according to an embodiment of the present invention. This arrangement is commercially available by INITIUM. In the case of Promi-MSD model, seven can be connected wirelessly and multiple Promi-MSDs can be simultaneously connected because there is one or two LAN ports. Promi-SD can be installed in a mobile.

In the case of Bluetooth, communication subjects initially recognize each other. After the recognition process, there is no interference with other communication devices. Seven Promi-SDs can be registered in a single Promi-MSP. A network server is connected to Promi-MSP through wire. Promi-SDs are mounted in a plurality of mobiles. The multiple Promi-SDs are registered in Promi-MSP. When power is supplied to the mobiles, information about starting positions of the mobiles is input by a user. The information about starting positions represents building and room numbers, unique coordinates and other unique positions. After the information is input, the Promi-SDs and Promi-MSP are connected to the network wirelessly and the Promi- MSP is connected to the server through wire to receive information of satellites that can be referred for the current positions of the mobiles and continuously obtain satellite information suitable for the positions of the mobiles when the mobiles are moved. A cellular phone including an ultrasonic sensor can be used as a mobile. The cellular phone is carried by a person such that the cellular phone can guide the person to his/her destination. Particularly, the cellular phone helps the person to find an entrance on a crowded street. Furthermore, in the case of large parking lot, the cellular phone memories the location of the parking lot and helps the person to find it later.

According to an aspect of the present invention, a method for controlling a positioning system using ultrasonic waves includes: the steps of: sequentially giving satellite identification numbers to the plurality of ultrasonic satellites; generating a synchronization signal and providing it to the plurality of ultrasonic satellites; and allowing the mobile to receive ultrasonic signals, which are generated by the plurality of ultrasonic satellites in the order of the satellite identification numbers when the ultrasonic satellites receive the synchronization signal, to measure distances between the mobile and the ultrasonic satellites.

The plurality of ultrasonic satellites respectively include timers and generate the ultrasonic signals at the time set by the timers when they receive the synchronization signal. Here, the ultrasonic satellites can periodically generate the ultrasonic signals at the time set by the timers after receiving the initial synchronization signal. The ultrasonic satellites can measure the distances among them and provide reference information about the velocity of the current medium to the mobile. In the method for controlling a positioning system using ultrasonic waves, the mobile can measure the coordinates of the ultrasonic satellites and distances between the mobile and the ultrasonic satellites to calculate its current position and posture.

According to another aspect of the present invention, a positioning system using ultrasonic waves includes: ultrasonic satellites generating ultrasonic signals; a mobile that receives the ultrasonic signals from the ultrasonic satellites to recognize its current position; a reference time broadcasting device for providing a synchronization signal to ultrasonic satellites currently operating among the ultrasonic satellites and the mobile; and a server for providing the coordinates of the ultrasonic satellites to the mobile.

In the positioning system using ultrasonic waves, the ultrasonic satellites can respectively include timers. In the positioning system using ultrasonic waves, the reference time broadcasting device can be selected from the ultrasonic satellites currently operating, commercial broadcast including visual information, a GPS satellite, a wireless LAN and a cellular phone. In the positioning system using ultrasonic waves, the mobile can be a cellular phone. The positioning system using ultrasonic waves according to an embodiment of the present invention can used indoors and has very high resolution of less than 0.001 meter.

As described above, the positioning system using ultrasonic waves and the method of controlling the same according to an embodiment of the present invention can realize accurate small-scale GPS. A cleaning robot currently widely used is expensive because it uses a giro, an acceleration sensor, a camera and so on for positioning. However, the positioning system according to an embodiment of the present invention can perform positioning at a very low cost.

In the meantime, location-based services require recognition of current positions. In this case, an embodiment of the present invention can provide positioning cheaply and accurately. For example, users can find a small entrance in a complicated market place or a specific store in an area where similar businesses are crowded.

While embodiments of the present invention have been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of determining a position of a mobile device, the method comprising:
    receiving, by a mobile device, a synchronization signal;
    synchronizing the mobile device using the synchronization signal;
    receiving, by the mobile device at a receipt time, an ultrasonic signal transmitted from a source located at a source location at a transmission time;
    receiving, by the mobile device at an additional receipt time, an additional ultrasonic signal transmitted from an additional source located at an additional source location at an additional transmission time, wherein each of the transmission time and the additional transmission time has a predetermined time interval from receipt of the synchronization signal from a source thereof; and
    determining the mobile device's position using:
        information of the source location,
        a time difference between the receipt time and the transmission time of the ultrasonic signal,
        information of the additional source location, and
        a time difference between the additional receipt time and the additional transmission time.

2. The method of claim 1, further comprising receiving information indicative of the transmission time.

3. The method of claim 2, wherein the information comprises a time difference between receipt of the synchronization signal and the transmission time of the ultrasonic signal.

4. The method of claim 1, further comprising receiving, by the mobile device, the information of the source location.

5. The method of claim 1, wherein the information of the source location is pre-stored in the mobile device.

6. The method of claim 1, wherein determining comprises computing a distance between the additional source location and the mobile device.

7. The method of claim 1, wherein the method repeats the act of receiving a further additional ultrasonic signal, and wherein determining further uses information relating to the further additional ultrasonic signal.

8. The method of claim 1, wherein determining further uses information of each predetermined time interval.

9. The method of claim 1, wherein determining comprises computing a distance between the source location and the mobile device.

10. The method of claim 1, further comprising receiving, by the mobile device, a transmission speed of the ultrasonic signal.

11. The method of claim 10, wherein determining further uses the transmission speed of the ultrasonic signal.

12. A system of determining a position of a mobile device, comprising:

a synchronizer configured to transmit a synchronization signal;

a plurality of ultrasonic signal transmitters, each of which is configured to transmit an ultrasonic signal at a predetermined time; and a mobile device configured to receive the synchronization signal and ultrasonic signals from at least part of the plurality of ultrasonic signal transmitters, wherein the mobile device is configured to determine the mobile device's position using information available thereto, wherein the predetermined time of each ultrasonic signal transmitter has a time interval from receipt of the synchronization signal from a source thereof.

13. The system of claim 12, wherein the information comprises location information of the at least part of the plurality of ultrasonic signal transmitters and information of a period during which the ultrasonic signal travels from each of the at least part of the plurality of ultrasonic signal transmitters to the mobile device.

14. The system of claim 12, wherein the mobile device is configured to receive information indicative of the predetermined time for each of the at least part of the plurality of ultrasonic signal transmitters to the mobile device.

15. The system of claim 14, wherein the information indicative of the predetermined time comprises a time difference between receipt of the synchronization signal and the predetermined time for each of the at least part of the plurality of ultrasonic signal transmitters to the mobile device.

16. The system of claim 12, wherein the mobile device is configured to receive location information of the at least part of the plurality of ultrasonic signal transmitters.

17. The system of claim 12, wherein location information of the at least part of the plurality of ultrasonic signal transmitters is pre-stored in the mobile device.

18. The system of claim 12, wherein the predetermined time of each ultrasonic signal transmitter is different from that of another.

19. A method of operating the system of claim 12, the method comprising, transmitting a synchronization signal from the synchronizer;

synchronizing at least part of the plurality of ultrasonic signal transmitters and the mobile device using the synchronization signal;

transmitting an ultrasonic signal from each of the at least part of the plurality of ultrasonic signal transmitters at a predetermined time thereof; and determining the mobile device's position using location information of the at least part of the plurality of ultrasonic signal transmitters and information of a period during which the ultrasonic signal travels from each of the at least part of the plurality of ultrasonic signal transmitters to the mobile device.

20. A method of determining a position of a mobile device, the method comprising:

receiving, by a mobile device, a synchronization signal;

synchronizing the mobile device using the synchronization signal;

receiving, by the mobile device at a receipt time, an first ultrasonic signal transmitted from a first source located at a source location at a first transmission time, which is after a first predetermined interval from the first source's receipt of the synchronization signal; and computing a first distance between the mobile device and the first source location using the first predetermined interval and further using a first time difference between receipt of the first ultrasonic signal and receipt of the synchronization signal by the mobile device;

receiving, by the mobile device, a second ultrasonic signal transmitted from a second source located at a second source location at a second transmission time, which is after a second predetermined interval from the second source's receipt of the synchronization signal; and computing a second distance between the mobile device and the second source location using the second predetermined interval and further using a second time difference between receipt of the second ultrasonic signal and receipt of the synchronization signal by the mobile device; and determining the mobile device's position using the first distance and the second distance.

21. The method of claim 20, further comprising receiving, by the mobile device, the information of the first source location.

22. The method of claim 20, wherein the information of the first source location is pre-stored in the mobile device.

23. The method of claim 20, wherein computing the first distance further uses the transmission speed of the ultrasonic signal.

24. The method of claim 20, wherein the first predetermined interval is different from the second predetermined interval.

25. The method of claim 20, wherein the first source transmits the synchronization signal, wherein the first predetermined interval is zero.

* * * * *